J. W. PHILP.
Cultivator.

No. 104,763.

Patented June 28, 1870.

UNITED STATES PATENT OFFICE.

JOHN WESLEY PHILP, OF HUMBOLDT, TENNESSEE.

IMPROVED CULTIVATOR.

Specification forming part of Letters Patent No. 104,763, dated June 28, 1870.

*To all whom it may concern:*

Be it known that I, JOHN WESLEY PHILP, of Humboldt, in the county of Gibson and State of Tennessee, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1:
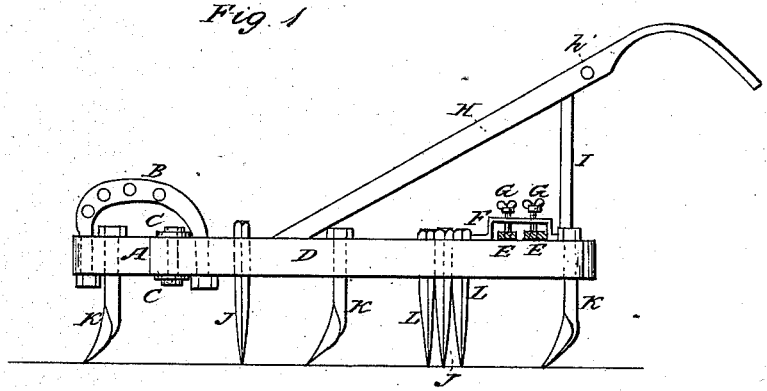
Figure 2:
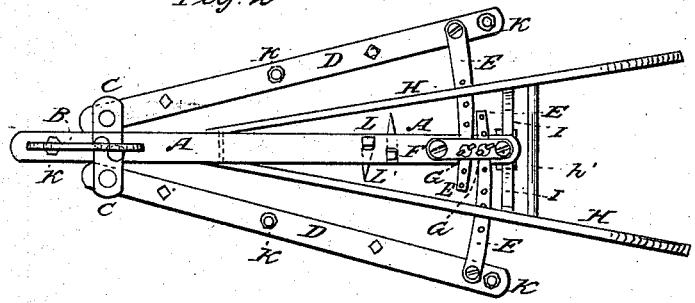

Figure 1 is a side view of my improved cultivator. Fig. 2 is a top view of the same.

Similar letters of reference indicate corresponding parts.

My invention has for its object improvement in cultivators; and the invention consists in the arrangement of the parts forming the cultivator, as will be hereinafter fully described.

A is the central beam of the cultivator, to the forward part of which is attached an arched bar, B, having a series of holes formed through its curved part for the adjustable attachment of the draft.

To the upper and lower sides of the forward part of the beam A are securely and rigidly attached two short cross bars or plates, C, between the ends of which are pivoted the forward ends of the two side beams, D, so that the rear ends of said side beams may be moved toward or from the central beam, A, as may be desired.

To the rear part of each of the side beams, D, is attached the outer end of a curved arm, E, which passes through the long keeper F, attached to the rear part of the central beam, A, where the said arms E are adjustably secured in place when adjusted by the thumb-screws G, which pass through screw-holes in the said keeper or strap F, and the points of which enter one or the other of the series of depressions or cavities in the said arms E, so that the side beams, D, may be securely held when adjusted to any desired distance apart.

H are the handles, the forward ends of which are attached to the forward part of the central beam, A. The handles H are held at the proper distance apart by a round, $h'$, and are supported at the proper elevation by the brace-bars I, the lower ends of which are attached to the rear end of the central beam, A. The beams A and D are provided with harrow-teeth J and cultivator-teeth K, arranged alternately, so as to more thoroughly break up and pulverize the soil.

To the central beam, A, are attached two harrow-teeth, L, placed near together, and placed at an angle, as shown in Fig. 2, so as to cross each other, to more thoroughly stir up and pulverize the soil in the middle part of the row. The inclined teeth L also serve to give steadiness to the rear part of the cultivator, to hold it down to the ground and prevent it from being thrown about by the variations of the draft. The entire cultivator, with the exception of the beams and handles, which are wood, is made of wrought or malleable iron, to adapt the cultivator for use in rough or stumpy ground.

Having thus described my invention, I claim as new and desire to secure by Letters Patent—

The arrangement of the frame A D, the arms E, set-screws $g$, keepers F, draft-bar B, handles H $h'$ I, cultivator-teeth K, harrow-teeth J, and crossed or inclined teeth, all constructed substantially as shown and described.

J. W. PHILP.

Witnesses:
W. A. ALLISON,
J. J. WILLIAMS.